United States Patent [19]
Schulze-Beckinghausen

[11] Patent Number: 5,081,888
[45] Date of Patent: Jan. 21, 1992

[54] APPARATUS FOR CONNECTING AND DISCONNECTING THREADED MEMBERS

[75] Inventor: Joerg E. Schulze-Beckinghausen, Garbsen, Fed. Rep. of Germany

[73] Assignee: Weatherford, U.S., Inc., Houston, Tex.

[21] Appl. No.: 441,813

[22] Filed: Nov. 27, 1989

[30] Foreign Application Priority Data

Dec. 1, 1988 [GB] United Kingdom ................ 8828084

[51] Int. Cl.$^5$ .............................................. B25B 13/50
[52] U.S. Cl. .................................. 81/57.16; 81/57.34
[58] Field of Search ................ 81/57.15, 57.16, 57.24, 81/57.33, 57.34, 57.35, 57.4

[56] References Cited

U.S. PATENT DOCUMENTS

| | | | |
|---|---|---|---|
| 2,737,839 | 3/1956 | Paget | 81/57.34 |
| 3,288,000 | 11/1966 | Foster | |
| 3,516,308 | 6/1970 | Ham et al. | 81/57.16 |
| 3,722,331 | 3/1973 | Radulescu | |
| 3,838,613 | 10/1974 | Wilms | 81/57.16 |
| 4,061,194 | 12/1977 | McCanse | 91/170 R |
| 4,574,664 | 3/1986 | Curry | 81/57.34 |
| 4,619,159 | 10/1986 | Kurek | |

OTHER PUBLICATIONS

General Services and Products Catalog, Weatherford 1988–1989, pp. 25–28.
Composite Catalog 1982–1983, Joy Manufacturing Co., pp. 74–75.
Composite Catalog 1982–1983, Eckel Tongs Back-up Units, p. 2953.
Reactive Torque System For A Rotary Drive Apparatus And A Gripping Device, UK Patent Application 38987/78, 2 Oct. 78.
Apparatus shown in Fig. 1 of this Pending Application and Described in the Text.
Composite Catalog 1982–1983 Varco Oil Tools, pp. 5–9.

Primary Examiner—D. S. Meislin
Attorney, Agent, or Firm—Guy McClung

[57] ABSTRACT

Apparatus for connecting and disconnecting threaded members including a power tong, a backup unit disposed below the power tong for gripping a second pipe, and apparatus for transmitting reaction forces generated by the power tong to the backup unit, the backup unit having devices for transmitting compressive or tensile forces between its members from the power tong which, in one embodiment, includes a hydraulic connection between a double acting hydraulic piston and cylinder assemblies incorporated in the members.

22 Claims, 5 Drawing Sheets

APPARATUS FOR CONNECTING AND DISCONNECTING THREADED MEMBERS

TECHNICAL FIELD

This invention relates to an apparatus for connecting and disconnecting threaded members.

BACKGROUND ART

During the construction of an oil or similar well it is necessary to connect successive lengths of pipe. This is achieved by a threaded connection.

Conventionally, a tool known as a power tong is used for gripping one length of pipe and rotating it relative to the next to make or break the joint. Such power tongs comprise an elongate body having, at one end, a pipe receiving recess and a jaw assembly for gripping and rotating a pipe. The jaw assembly is connected to a source of power, for example a hydraulic motor which, in use, rotates the jaw assembly (and the pipe) relative to the elongate body. The reaction force at the other end (the free end) of the elongate body is constrained by a cable which is connected between the free end of the elongate body and a convenient anchor point. A tension measuring device can conveniently be incorporated in the cable to provide an indication of the torque applied to the joint.

In certain situations, particularly where large diameter pipes and large torques are involved no convenient anchor points are available. Furthermore, cables have been known to snap or break loose under tension causing injury and death to drilling personnel.

In order to meet this problem the prior art provided an apparatus for connecting and disconnecting threaded members which apparatus comprises a power tong having a pipe receiving recess and a jaw assembly for gripping and rotating a first pipe, a backup unit for gripping a second pipe, and means for transmitting reaction forces generated by said power tong to said backup unit.

Heretofore the means has comprised a connection between the free end of the elongate body of the power tong and the free end of the backup unit remote from the second pipe.

In use, the reaction force on the body of the power tong is transmitted through the connection and the backup to the second pipe. This creates a force tending to move the pipe receiving recess and the corresponding pipe receiving recess in the backup unit out of axial alignment, thereby tending to bend the pipe.

Whilst conventional steel pipes can e~ ily withstand the bending forces involved this is not the case for lighter alloy pipes (known as "premium tubes") which are far less robust than conventional steel pipes and which must be handled with greater care. Furthermore, such bending forces cause concentrated stresses where the threads of the pipes contact one another and can cause galling, particularly with "premium tubes".

Whilst it would be possible to increase the rigidity of the prior art apparatus this would increase the weight. However, since the apparatus should be easy to handle it is desirable that it should be relatively light.

The aim of at least preferred embodiments of the present invention is to provide an apparatus which is relatively light and which can be used with premium tubes.

DISCLOSURE OF THE INVENTION

According to the present invention there is provided an apparatus for connecting and disconnecting threaded members, which apparatus comprises a power tong having a pipe receiving recess and a jaw assembly for gripping and rotating a first pipe, a backup unit for gripping a second pipe, and means for transmitting reaction forces generated by said power tong to said backup unit characterized in that said means comprises a first member connected to one of said power tong and said backup unit remote from the pipe receiving recess thereof and to the other of said power tong and said backup unit to one side of the pipe receiving recess thereof;

a second member connected to said one of said power tong and said backup unit remote from the pipe receiving recess thereof and to said other of said power tong and said backup unit to the other side of the pipe receiving recess thereof; and means for transmitting compressive and/or tensile forces in one of said first and second members to the other of said first and second members Preferably, said first member and said second member are connected to said other of said power tong and said backup unit on diametrically opposite sides of the pipe receiving recess thereof.

Advantageously, said first member and said second member are connected to the other of said power tong and said backup unit via pillars which extend from and are substantially perpendicular to said other of said power tong and said backup unit.

Preferably, said pillars are provided with cup washers to maintain said power tong spaced from said backup unit.

In one embodiment said first member and said second member each comprise straps and said means for transmitting compressive and/or tensile forces in one of said first and second members to the other of said first and second members comprises a third member mounted for pivotal movement on said one of said power tong and said backup unit about an axis extending between said first member and said second member, said third member having a first tension arm and a second tension arm extending away from said axis, said first member being pivotally connected to said first tension arm and said second member being pivotally connected to said second tension arm.

Preferably said third member is a tube although it could also comprise a solid bar.

Advantageously, said first tension arm and said second tension arm extend substantially perpendicular to said axis.

Preferably, said first strap and said second strap extend substantially perpendicular to said axis.

Advantageously, said power tong and said backup unit are separated by a pneumatic bellows.

Whilst the embodiment just described is quite suitable for smaller torques it is not recommended for large torques.

In another embodiment, particularly but not exclusively adapted for large torques, the first and second members each comprise a piston and cylinder and said means comprises a pipe connecting the working chambers of said piston and cylinders.

Preferably, each piston and cylinder is a double acting piston and cylinder and said means comprises pipes connecting opposed working chambers of said double acting pistons and cylinders.

Advantageously, said apparatus includes a pressure gauge connected to at least one of said pipes for obtaining a reading indicative of the torque applied to a joint.

Means may be provided for suspending said apparatus, in use, via said power tong or via said backup unit.

If said power tong is provided with means for suspending said apparatus then, preferably, a counterweight is provided to bias the pipe receiving recess in said backup unit beneath the pipe receiving means in said power tong when said apparatus is in use.

For a better understanding of the invention reference will now be made, by way of example, to the accompanying drawings, in which:

DESCRIPTION OF PRIOR ART

Figure 1:
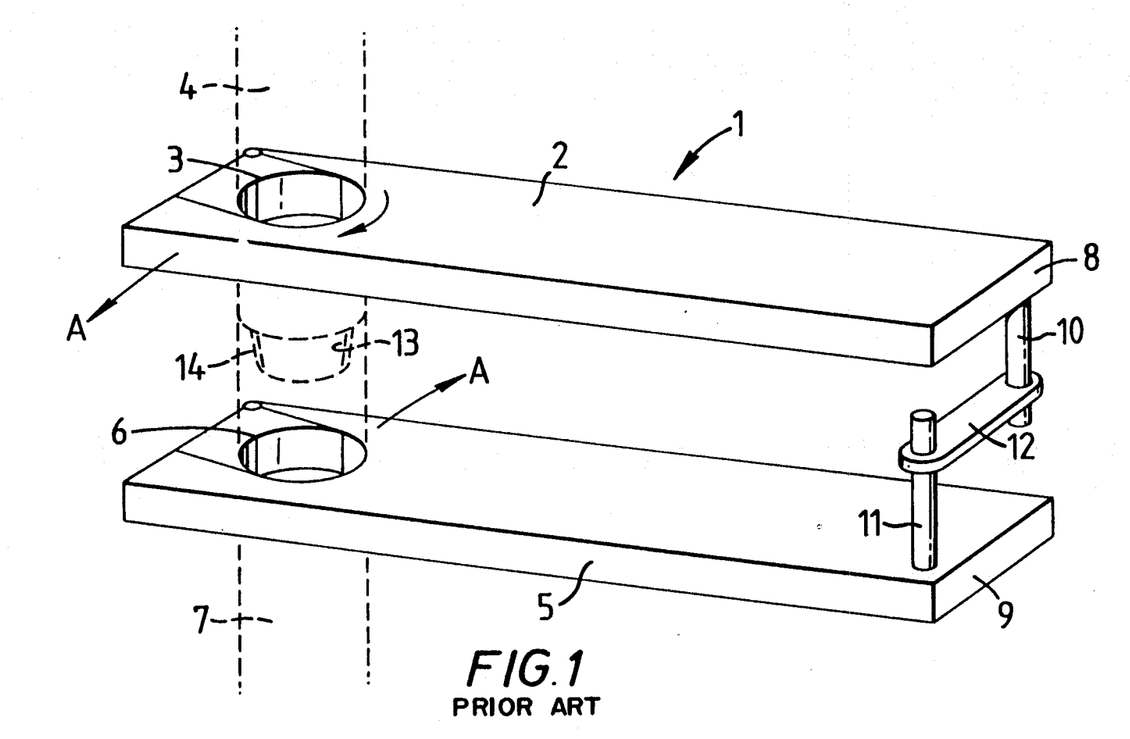
FIG. 1 is a schematic perspective view showing the principles of operation of a known apparatus for connecting and disconnecting threaded members in the process of connecting two lengths of pipe.

Referring to FIG. 1 of the drawings, there is shown a known apparatus for connecting and disconnecting threaded members. The apparatus, which is generally identified by reference numeral 1 comprises a power tong 2 having a pipe receiving recess 3. A rotary (not shown) is contained within the power tong 2 and is provided with a jaw assembly for gripping and rotating a pipe 4 under power from a hydraulic drive (not shown).

A backup unit 5 is disposed below the power tong 2 and has a pipe receiving recess surrounded by jaws (not shown) which grip pipe 7.

The free end 8 of the power tong 2 is connected to the free end 9 of the backup by an arrangement diagrammatically shown as comprising pillars 10 and 11 and a horizontal cross-bar 12 slidably mounted on both pillars 10 and 11.

In use, pipe 7 projects upwardly from a well bore and is held against axial and rotation movement by locking slips (not shown).

Backup unit 5 is mounted on pipe 7 and pipe 4 is inserted in pipe receiving recess 3. The male thread 13 on pipe 4 is then introduced into socket 14 on pipe 7 and the power tong 2 is actuated to rotate the pipe 7. After initial run in the joint is progressively tightened to the required torque. The reaction force is transmitted to backup unit 5 through pillar 10, cross-bar 12 and pillar 11. Cross-bar 12 may include a load cell for generating a signal indicative of the torque applied to the joint.

It will be appreciated that, in use, a force is created which tends to move the pipe receiving recesses 3 and 6 out of axial alignment as indicated by arrows A—A. This applies a bending force to the pipe which can damage the pipe.

DESCRIPTION OF PREFERRED EMBODIMENTS OF INVENTION

Figure 2:
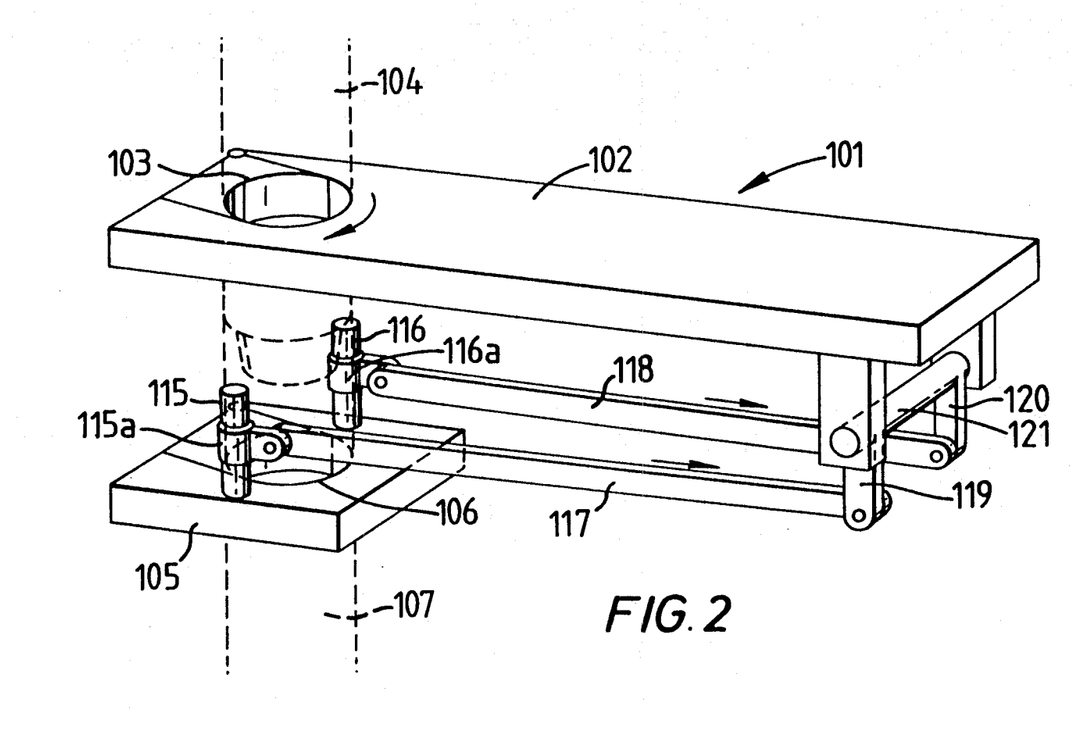
FIG. 2 is a schematic perspective view showing the principles of operation of a first embodiment of apparatus in accordance with the invention for connecting and disconnecting threaded members in the process of connecting two lengths of pipe.

Referring to FIG. 2 there is shown one embodiment of an apparatus in accordance with the invention which is generally identified by reference numeral 101. The apparatus 101 comprises a power tong 102 which has a pipe receiving recess 103. The power tong 102 is generally similar to power tong 2 shown in FIG. 1.

A backup unit 105 is disposed below the power tong 102 and has two upwardly extending pillars 115 and 116 which are situated on diametrically opposite sides of pipe receiving recess 106 and equidistant from the centre thereof.

A sleeve 115a is slidably mounted on pillar 115 whilst a sleeve 116a is slidably mounted on pillar 116.

One end of a strap 117 is pivotally attached to sleeve 115a whilst the other end is pivotally mounted to the free end of a tension arm 119. Similarly, one end of a strap 118 is pivotally attached to sleeve 116a whilst the other end is pivotally mounted to the free end of a tension arm 120. Tension arms 119 and 120 are rigidly connected to a solid bar 121 of circular cross-section which is pivotally mounted on the power tong 102.

In use, as power tong 102 screws pipe 104 into pipe 107 the torque applied to pipe 104 creates a reaction force which, because of solid bar 121 and tension arms 119 and 120 results in substantially equal and opposite turning movements being applied to backup unit 105 via straps 117 and 118. This inhibits the tendency of pipe receiving recess 103 to move out of axial alignment with pipe receiving recess 106 under load and thus substantially eliminates the bending of the pipe associated with the prior art.

The torque applied to the joint may conveniently be determined by placing a load cell in one of straps 117 and 118.

Figure 3:
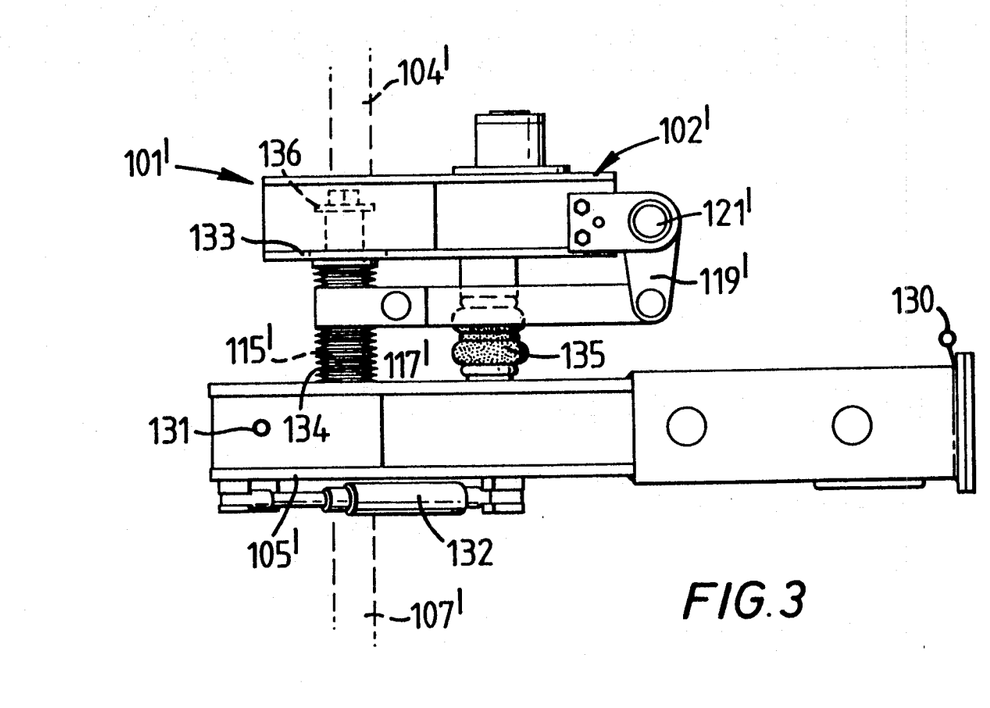
FIG. 3 is a simplified side elevation of an apparatus in accordance with the invention.

FIG. 3 shows a simplified side view of an apparatus in accordance with the invention. The apparatus is generally similar to that shown in FIG. 2 and corresponding parts have been designated by the same reference numerals with the addition of an apostrophe.

Apparatus 101' shown in FIG. 3 comprises a power tong 102' and a backup unit 105'. The backup unit 105' is supported, in use, by three chains attached to mounting points at the rear of the backup unit 105, and the front of the backup unit to either side of the pipe receiving recess 106 respectively. Mounting rings 130 and 131 can be seen in FIG. 3. The rear of the backup unit 105' is of relatively light construction and supports connection points for hydraulic fluid supply and return lines.

Hydraulic piston and cylinder assembly 132 is used to open and close the jaws in the backup unit 105' to grip the pipe 107'. Pillars 115' and 116' extend upwardly through enlarged slots in the base 133 of the power tong 102'. The power tong 102' is separated from the backup unit 105' by a stack of cup washers 134 surrounding each of pillars 115', 116' and a pneumatic bellows 135 mounted as shown. As a joint is tightened the power tong 102' moves towards the backup unit 105' thereby compressing the cup washers 134 and the pneumatic bellows 135. The tops of the pillars 115' and 116' are provided with plates 136 to inhibit the tong being separated from the backup 105', for example during a disconnecting operation. It should be noted that there is ample clearance between the pillars 115' and 116' and their respective holes in base 133.

A load cell is incorporated in the strap (not shown) to measure the torque applied to the joint.

Figure 4:
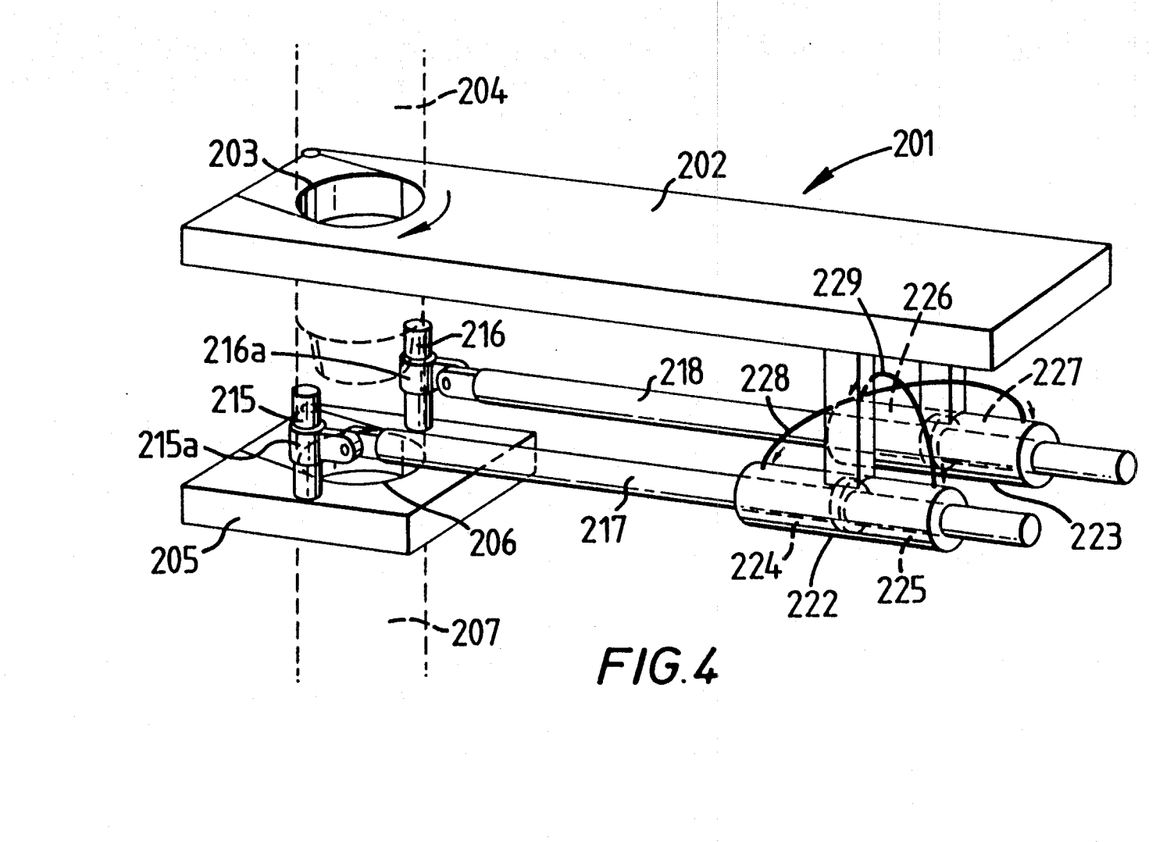
FIG. 4 is a schematic perspective view showing the principles of operation of a second embodiment of apparatus in accordance with the invention for connecting and disconnecting threaded members in the process of connecting two lengths of pipe.

Referring now to FIG. 4 there is shown another embodiment of apparatus in accordance with the invention which is more particularly but not exclusively intended for handling large pipes and high torques. The apparatus, which is generally identified by reference numeral 201 comprises a power tong 202 having a pipe receiving recess 203 circumjacent a pipe 204. The power tong 202 is generally similar to power tongs 2 and 102.

A backup unit 205, which is generally similar to backup unit 105 is disposed beneath power tong 202. The backup unit 205 has two upwardly extending pillars 215 and 216 which are situated on diametrically opposite sides of pipe receiving recess 206 and equidistant from the centre thereof.

Sleeves 215a and 216a are slidably mounted on pillars 215 and 216 respectively.

The free end of a piston 217 of a first double acting hydraulic piston and cylinder assembly 222 is pivotally connected to the sleeve 215a. Similarly the free end of a piston 218 of a second double acting hydraulic piston and cylinder assembly 223 is pivotally connected to the sleeve 216a. The bodies of the first and second double acting hydraulic piston and cylinder assemblies 222 and 223 are mounted on the power tong 202 by ball joints (not detailed) to allow free movement.

The first double acting hydraulic piston and cylinder assembly 222 is provided with first and second working chambers 224 and 225 respectively. Similarly, the second double acting hydraulic piston and cylinder assembly 223 is provided with first and second working chambers 226 and 227 respectively. Hydraulic pipes 228 and 229 connect opposed working chambers of the double acting hydraulic piston and cylinder assemblies. Thus, hydraulic pipe 228 connects the first working chamber 224 of the first double acting hydraulic piston and cylinder assembly 222 to the second working chamber 227 of the second double acting hydraulic piston and cylinder assembly 223. Similarly, hydraulic pipe 229 connects the second working chamber 225 of the first double acting hydraulic piston and cylinder assembly 222 to the first working chamber 226 of the second double acting hydraulic piston and cylinder assembly 223

In use, as power tong 202 screws pipe 204 into pipe 207 the torque applied to pipe 204 creates a reaction force which compresses the piston 218. Pressure builds up in the first working chamber 226 of the second double acting hydraulic piston and cylinder assembly 223 and this is transmitted to the second working chamber 225 of the first double acting hydraulic piston and cylinder assembly 222 which transmits the force to the piston 217. This results in substantially equal and opposite turning movements being applied to the backup unit 205. This inhibits the tendency for pipe receiving recess 206 to move out of axial alignment with pipe receiving recess 203 under load and thus inhibits bending of the pipe.

The torque applied to the pipes 204 and 207 can be determined by measuring the hydraulic pressure in the pipes 228 and/or 229.

Figure 5:
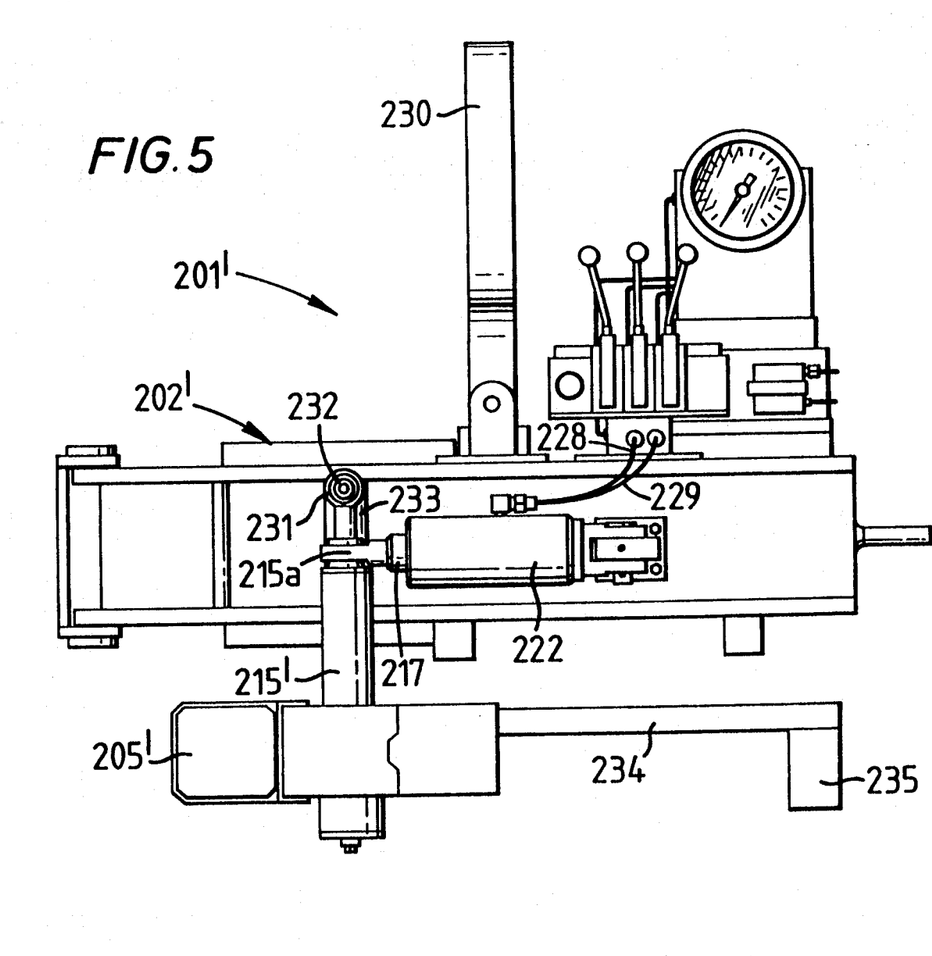
FIG. 5 is a perspective view of another apparatus in accordance with the invention.

FIG. 5 shows an apparatus based on the apparatus shown in FIG. 4. Similar parts have been identified by the same reference numeral as used in FIG. 4 with the addition of an apostrophe.

As can be seen, the apparatus 201' is provided with a hanger 230 by which the apparatus 201' can be supported in use. The hanger 230 is connected to the power tong 202' The backup unit 205' is slidably mounted on pillars, only one of which, 215', is shown. The top of each pillar is provided with a bush 231 which is slidably mounted on an axle 232 which projects horizontally from a bar 233 which itself is mounted for pivotal movement about a vertical axis.

The backup unit 205' is provided with a pair of rearwardly extending arms 234 which are connected to a counterweight 235 to bias the backup unit 205' into the position shown.

It will be appreciated that, when each embodiment is in use, the power tong and the backup unit converge as the upper pipe enters the lower pipe. In the embodiment shown in FIGS. 2 and 3 the apparatus is supported from the backup unit which is attached to the lower pipe 107 which remains stationary during the joining operation. In this embodiment the cable supporting the hanger may be maintained at a constant length throughout the joining operation.

Various modifications to the embodiments described could be made for example the pillars could be rigidly attached to the power tong rather than the backup unit and the hydraulic pistons and cylinders or the straps attached to the backup unit remote from the pipe receiving recess thereof.

What is claimed is:

1. An apparatus for connecting and disconnecting threaded members, which apparatus comprises a power tong having a pipe receiving recess and a jaw assembly for gripping and rotating a first pipe, a backup unit having a pipe receiving recess for gripping a second pipe, and means for transmitting reaction forces generated by said power tong to said backup unit, said means for transmitting reaction forces comprising a first member connected to one of said power tong and said backup unit away from the pipe receiving recess thereof and to the other of said power tong and said backup unit to one side of the pipe receiving recess thereof, a second member connected to said one of said power tong and said backup unit away from the pipe receiving recess thereof and to said other of said power tong and said backup unit to the other side of the pipe receiving recess thereof, means for transmitting compressive and tensile forces in one of said first and second members to the other of said first and second members, said first member and said second member each comprising straps, said means for transmitting compressive and tensile forces in one of said fist and second members to the other of said first and second members comprising a third member mounted for pivotal movement on said one of said power tong and said backup unit about an axis extending between said first member and said second member, said third member having a first tension arm and a second tension arm extending away from said axis, and said first member being pivotally connected to said first tension arm and said second member being pivotally connected to said second tension arm.

2. Apparatus as claimed in claim 1, wherein said first member and said second member are connected to said other of said power tong and said backup unit on diametrically opposite sides of the pipe receiving recess thereof.

3. Apparatus as claimed in claim 1, wherein said first member and said second member are connected to the other of said power tong and said backup unit via pillars which extend from and are substantially perpendicular to said other of said power tong and said backup unit.

4. Apparatus as claimed in claim 3, wherein said pillars are provided with cup washers to maintain said power tong spaced from said backup unit.

5. Apparatus as claimed in claim 1, wherein said third member is a tube.

6. Apparatus as claimed in claim 1, wherein said first tension arm and said second tension arm extend substantially perpendicular to said axis.

7. Apparatus as claimed in claim 1, wherein said first strap and said second strap extend substantially perpendicular to said axis.

8. Apparatus as claimed in claim 1, wherein said power tong and said backup unit are separated by a pneumatic bellows.

9. Apparatus as claimed in claim 1, wherein the first and second members each comprise a piston and cylinder and said means for transmitting reaction forces comprises a pipe connecting the working chambers of said piston and cylinders.

10. Apparatus as claimed in claim 9, wherein each piston and cylinder is a double acting piston and cylinder and said means for transmitting reaction forces comprises pipes connecting opposed working chambers of said double acting pistons and cylinders.

11. Apparatus as claimed in claim 9, wherein said apparatus includes a pressure gauge connected to at least one of said pipes for obtaining a reading indicative of the torque applied to a joint.

12. Apparatus as claimed in claim 1, including means for suspending said apparatus via said power tong, and a counterweight disposed to bias the pipe receiving recess in said backup unit beneath the pipe receiving recess in said power tong when said apparatus is in use.

13. An apparatus for connecting and disconnecting threaded members, which apparatus comprises a power tong having a pipe receiving recess and a jaw assembly for gripping and rotating a first pipe, a backup unit having a pipe receiving recess for gripping a second pipe, and means for transmitting reaction forces generated by said power tong to said backup unit, and said means for transmitting reaction forces comprising
   a first member connected to one of said power tong and said backup unit away from the pipe receiving recess thereof and to the other of said power tong and said backup unit to one side of the pipe receiving recess thereof;
   a second member connected to said one of said power tong and said backup unit away from the pipe receiving recess thereof and to said other of said power tong and said backup unit to the other side of the pipe receiving recess thereof;
   said first member and said second member being connected to the other of said power tong and said backup unit via pillars which extend from diametrically opposite sides of the pipe receiving recess thereof and are substantially perpendicular to said other of said power tong and said backup unit,
   means for transmitting compressive and tensile forces in one of said first and second members to the other of said first and second members,
   said first member and said second member each comprising straps, said means for transmitting compressive or tensile forces in one of said first and second members to the other of said first and second members comprising a third member mounted for pivotal movement on said one of said power tong and said backup unit about an axis extending between said first member and said second member, said third member having a first tension arm and a second tension arm extending away from said axis, and said first member being pivotally connected to said first tension arm and said second member being pivotally connected to said second tension arm.

14. Apparatus as claimed in claim 13, wherein said first tension arm and said second tension arm extend substantially perpendicular to said axis.

15. Apparatus as claimed in claim 14, wherein said first strap and said second strap extend substantially perpendicular to said axis.

16. Apparatus as claimed in claim 13, wherein said power tong and said backup unit are separated by a pneumatic bellows.

17. Apparatus as claimed in claim 13, including means for suspending said apparatus via said power tong, wherein a counterweight is provided to bias the pipe receiving recess in said backup unit beneath the pipe receiving recess in said power tong when said apparatus is in use.

18. An apparatus for connecting and disconnecting threaded members, which apparatus comprises a power tong having a pipe receiving recess and a jaw assembly for gripping and rotating a first pipe, a backup unit having a pipe receiving recess for gripping a second pipe, and means for transmitting reaction forces generated by said power tong to said backup unit, and said means for transmitting reaction forces comprising
   a first member connected to one of said power tong and said backup unit away from the pipe receiving recess thereof and to the other of said power tong and said backup unit to one side of the pipe receiving recess thereof,
   a second member connected to said one of said power tong and said backup unit away from the pipe receiving recess thereof and to said other of said power tong and said backup unit to the other side of the pipe receiving recess thereof,
   said first member and said second member being connected to the other of said power tong and said backup unit via pillars which extend from diametrically opposite sides of the pipe receiving recess thereof and are substantially perpendicular to said other of said power tong and said backup unit,
   means for transmitting compressive and/or tensile forces in one of said first and second members to the other of said first and second members, and said first and second members each comprising a piston and cylinder and said means comprises a pipe connecting the working chambers of said piston and cylinders.

19. Apparatus as claimed in claim 18, wherein each piston and cylinder is a double acting piston and cylinder and said means for transmitting reaction forces comprises pipes connecting opposed working chambers of said double acting pistons and cylinders.

20. Apparatus as claimed in claim 18 wherein said apparatus includes a pressure gauge connected to at least one of said pipes for obtaining a reading indicative of the torque applied to a joint.

21. Apparatus as claimed in claim 18 wherein said power tong and said backup unit are separated by a pneumatic bellows.

22. Apparatus as claimed in claim 18, including means for suspending said apparatus via said power tong, wherein a counterweight is provided to bias the pipe receiving recess in said backup unit beneath the pipe receiving recess in said power tong when said apparatus is in use.

* * * * *